US006896312B2

(12) United States Patent
Talbot

(10) Patent No.: US 6,896,312 B2
(45) Date of Patent: May 24, 2005

(54) VARIABLE HEIGHT COVERING SYSTEM

(75) Inventor: Robert A. Talbot, Holland, MA (US)

(73) Assignee: Pioneer Consolidated Corporation, North Oxford, MA (US)

( * ) Notice: Subject to any disclaimer, the term of this patent is extended or adjusted under 35 U.S.C. 154(b) by 0 days.

(21) Appl. No.: 10/824,191

(22) Filed: Apr. 14, 2004

(65) Prior Publication Data

US 2004/0217622 A1 Nov. 4, 2004

Related U.S. Application Data

(60) Provisional application No. 60/462,587, filed on Apr. 14, 2003.

(51) Int. Cl.$^7$ .................................................. B60P 7/04
(52) U.S. Cl. ........................................ 296/98; 296/101
(58) Field of Search ..................... 296/98, 101, 100.01, 296/100.16

(56) References Cited

U.S. PATENT DOCUMENTS

| 3,549,197 A | 12/1970 | Sibley ......................... 296/100 |
| 3,774,958 A | 11/1973 | Thorpe .......................... 296/98 |
| 3,868,142 A | 2/1975 | Bachand et al. ............... 296/98 |
| 4,050,734 A | 9/1977 | Richard ......................... 296/98 |
| 4,341,416 A | 7/1982 | Richard ......................... 296/98 |
| 4,516,802 A | 5/1985 | Compton ........................ 296/98 |
| 4,740,029 A | 4/1988 | Tuerk .......................... 296/100 |
| 4,842,323 A | 6/1989 | Trickett ......................... 296/98 |
| 4,848,823 A | 7/1989 | Flohr et al. .................... 296/98 |
| 5,031,955 A | 7/1991 | Searfoss ........................ 296/98 |
| 5,054,840 A | 10/1991 | Wilhite ......................... 296/98 |
| 5,179,991 A | 1/1993 | Haddad ..................... 296/98 X |
| 5,205,605 A | 4/1993 | Haddad ......................... 296/98 |
| 5,238,287 A | 8/1993 | Haddad, Jr. ................... 296/98 |
| 5,292,169 A | 3/1994 | O'Brian ........................ 296/98 |
| 5,303,972 A | 4/1994 | Heider et al. ................. 296/98 |
| 5,340,187 A | 8/1994 | Haddad ......................... 296/98 |
| 5,697,664 A | 12/1997 | Chenowth ..................... 296/98 |
| 5,823,604 A | 10/1998 | Chenowth ..................... 296/98 |
| 5,829,819 A | 11/1998 | Searfoss ........................ 296/98 |
| 5,957,523 A | 9/1999 | Haddad, Jr. ................... 296/98 |
| 6,089,645 A | 7/2000 | Haddad, Jr. ................... 296/98 |
| 6,109,680 A * | 8/2000 | Horner et al. ................. 296/98 |
| 6,206,448 B1 | 3/2001 | Haddad, Jr. ................... 296/89 |
| 6,250,709 B1 * | 6/2001 | Haddad, Jr. ................... 296/98 |
| 6,257,646 B1 * | 7/2001 | Searfoss ........................ 296/98 |
| 6,695,382 B2 * | 2/2004 | Ciferri et al. ................. 296/98 |

FOREIGN PATENT DOCUMENTS

| EP | 0 581 512 B1 | 10/1996 |
| JP | 62131835 | 6/1987 |
| JP | 63173740 | 7/1998 |

* cited by examiner

Primary Examiner—Joseph D. Pape
(74) Attorney, Agent, or Firm—Weingarten, Schurgin, Gagnebin & Lebovici LLP

(57) ABSTRACT

A system for manipulating a transport container cover using a gantry assembly. The gantry assembly supports a cover assembly for housing a cover to be deployed over a load. The gantry assembly has a three telescoping sections including a base section fixed with respect to a truck, a top section fixed to the cover assembly and a middle section therebetween. The sections are adjustable to a height such that the cover will extend above the transport container and the load therein. A lift mechanism aids the movement of the gantry assembly upward along with the cover assembly. The sections telescope from one another as the lift mechanism rises, thereby allowing the cover to be raised several feet above the truck cab or container.

7 Claims, 9 Drawing Sheets

VARIABLE HEIGHT COVERING SYSTEM

CROSS REFERENCE TO RELATED APPLICATIONS

This application claims the priority of U.S. Provisional Application No. 60/462,587 filed Apr. 14, 2003 entitled, VARIABLE HEIGHT COVERING SYSTEM, the whole of which is hereby incorporated by reference herein.

STATEMENT REGARDING FEDERALLY SPONSORED RESEARCH OR DEVELOPMENT

Not Applicable.

FIELD OF THE INVENTION

This invention relates to a transport container covering system, and more particularly to a covering system employing a gantry assembly.

BACKGROUND OF THE INVENTION

Covers for transport containers, as found in or used with trucks, trailers and other transport vehicles, are necessary for many reasons. For example, such covers reduce the likelihood that the load being carried escapes, and also protect the load from the elements. These covers are commonly housed at the front of the container in a cover assembly, and are pulled over the container. Often the covers are large and heavy, and therefore manipulating them manually is very difficult. Accordingly, various automated systems for manipulating transport container covers have been developed.

Some existing systems for manipulating truck container covers include telescopic arms deployed on opposite sides of the container to be covered, and attached at the ends of the cover. These arms are used to extend the cover over, and remove it from, the top of the container. Such systems may deploy the cover by extending the telescopic arms along the sides of the container.

Other existing systems may use a gantry assembly to manipulate a container cover. These assemblies often support a cover assembly used for cover deployment, and are usually mounted behind the cab of a vehicle. During cover deployment, the gantry assembly lifts the cover assembly above the container top, and the cover is extended across the container by, for example, a pullrope attached thereto. The cover is fastened at the back of the container, and the gantry assembly is lowered to bring the cover down over the load.

While generally effective, covering systems with side mounted arms may not be appropriate for all situations. For example, when a container being covered must be maneuvered in a relatively small area, the amount of clearance beyond the sides of the transport container may be minimal. In that circumstance, arms disposed beyond the sides of the container limit the maneuverability of the transport vehicle. Side mounted arms are also relatively expensive, and are susceptible to damage from inadvertent contact with walls or other vehicles.

Covering systems using gantry assemblies also have their shortcomings. These systems typically have a lift mechanism that is not mounted or fixed with respect to the truck body or container such that the entire mechanism rises concurrently with the gantry assembly. Use of these lift mechanisms, and their associated components, increases both maintenance and operation costs because of the greater number of moving parts. Safety is another concern for such systems as additional moving parts increase the likelihood that an operator may be pinched or the like. Furthermore, these systems often provide limited clearance above the load of a transport container. Poor clearance may lead to damage to the gantry assembly, and the cover itself when it comes in contact with the container load during deployment.

SUMMARY OF THE INVENTION

In accordance with the present invention, there is disclosed a covering system for manipulating a transport container cover using a gantry assembly. The gantry assembly has three telescoping sections with each section having a pair of legs. The top section is fixed to a cover assembly housing a cover. Thus, as the gantry assembly moves upward, so does the cover assembly and its cover. When the gantry assembly is raised, the system enables an operator to conveniently extend the cover over the top of the transport container.

The system operates in the following manner. The gantry assembly is raised to an intended height above the container's top. The cover is unrolled from the cover assembly to cover the container, and the rear of the cover is secured by tying an attached pullrope to a suitable fastener fixed to the container or a truck body. The gantry assembly is lowered to a position at or below the container top, bringing the cover into engagement with the container. This engagement tends to minimize spillage of the container load.

The telescopic sections of the gantry assembly include a base section, a middle section and a top section. The base section is fixed to the truck, and the top section is fixed to the cover assembly. The middle section is positioned between the base and top sections. The system also includes a lift mechanism such as a hydraulic assembly. The lift mechanism is fixed with respect to the base section and the truck, and it has a component fixed to the cover assembly for moving the cover upward.

As the lift mechanism rises, the top section is pulled from the middle section of the gantry assembly until a stop mechanism is engaged. With the lift mechanism continuing upward, engagement of the stop mechanism causes the middle section to pull from the base section. The maximum height of the gantry assembly may depend on the characteristics of the lift mechanism such as, for example, the stroke lengths of its components. Alternatively, a maximum height above the container top is reached when another stop mechanism is engaged, and the middle section may not move further upward. Also, the operator may stop the lift mechanism at any point while the gantry assembly is moving upward.

DESCRIPTION OF THE DRAWINGS

The invention will be more fully understood by reference to the following detailed description of the preferred embodiments in conjunction with the drawings, of which.

DETAILED DESCRIPTION OF THE PREFERRED EMBODIMENTS

Figure 1:
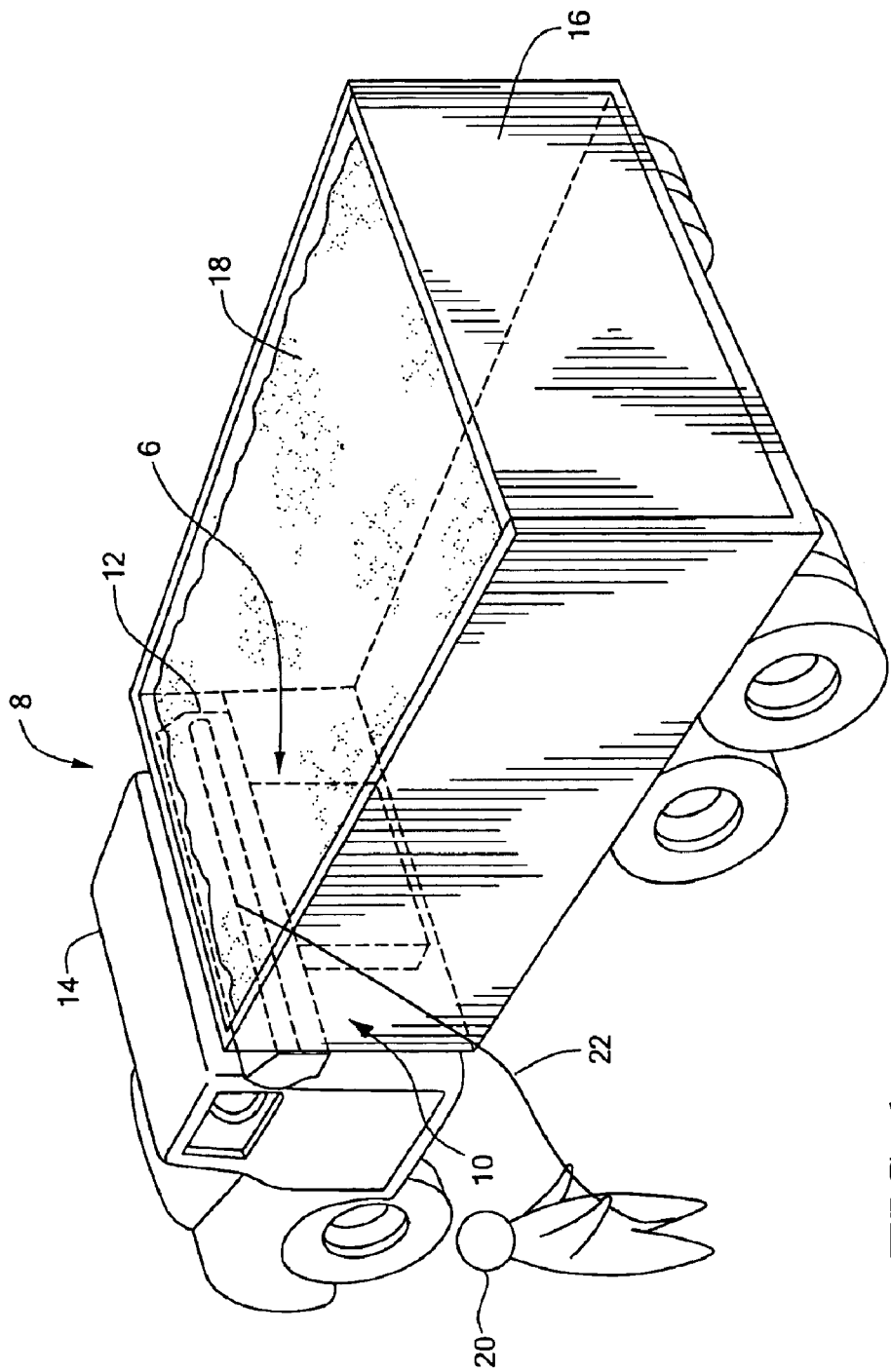
FIG. 1 shows a covering system according to the present invention installed on a truck carrying a container, and with a gantry assembly in a lowered position and the cover withdrawn.
Figure 2:
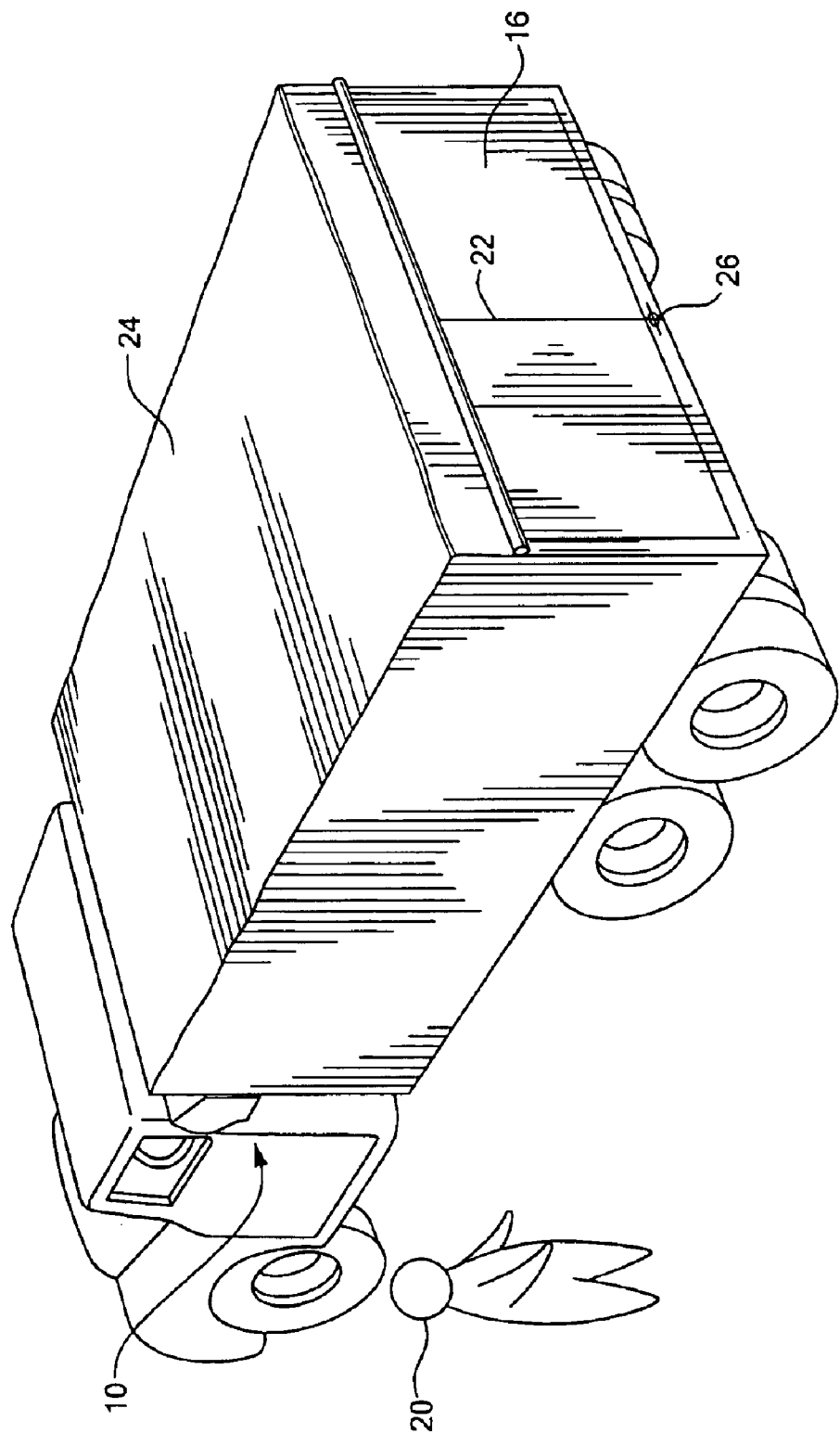
FIG. 2 is a schematic of the gantry assembly of FIG. 1 in a lowered position with the cover extended over the container and attached to an attachment point.

FIG. 1 shows an embodiment of the disclosed covering system 6 mounted on a truck 8. The covering system has a gantry assembly 10 and a cover assembly 12. The gantry assembly is schematically shown, and is mounted between a truck cab 14 and a transport container 16 for holding a load 18. An operator 20 and a pullrope or line 22 attached to an end of a retracted flexible cover 24, see FIG. 2, are shown. The gantry assembly is in a lowered position such that the cover assembly does not extend significantly above the truck cab, or the transport container.

FIG. 2 shows the gantry assembly 10 in a lowered position with a cover 24 fully extended over the top of the container 16. The pullrope 22 is attached to an attachment point 26 on the truck 8 or the transport container 16.

Figure 3:
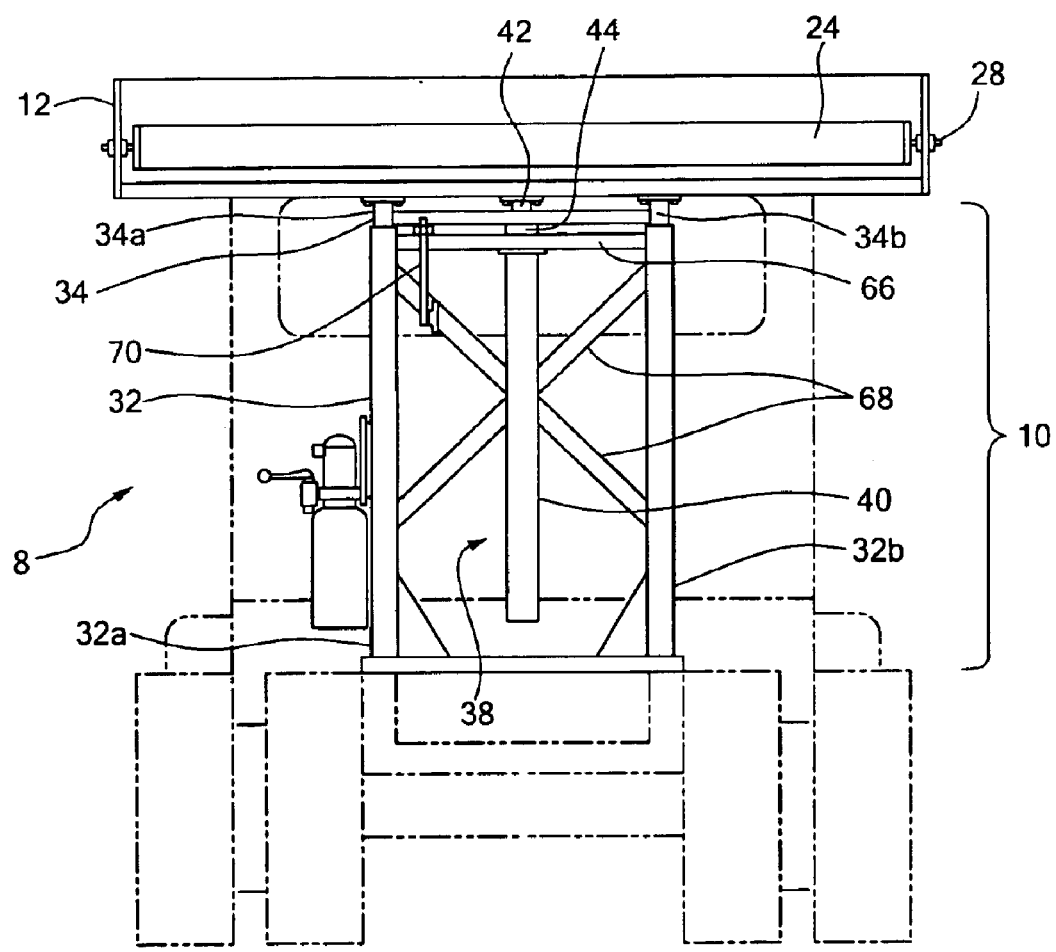
FIG. 3 is a rear view of the gantry assembly of FIG. 1 in a lowered position.
Figure 3A:
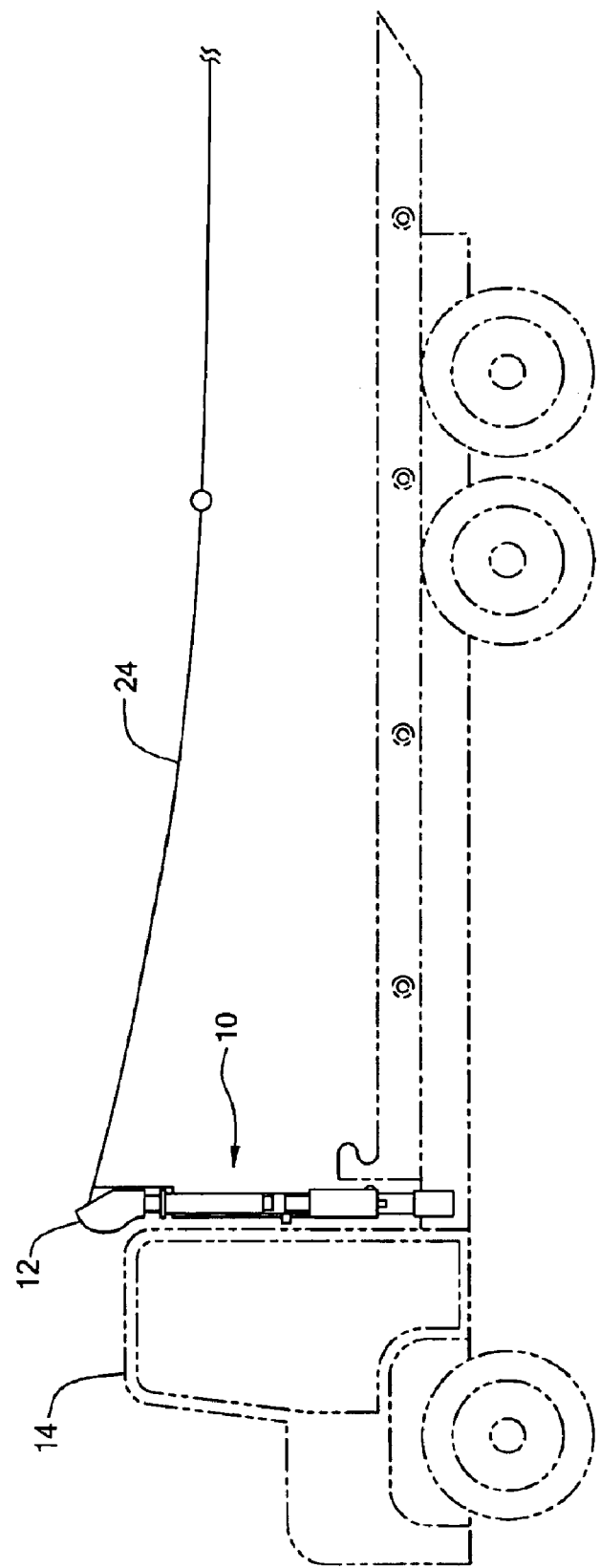
FIG. 3A is a side view of the gantry assembly of FIG. 3.
Figure 4:
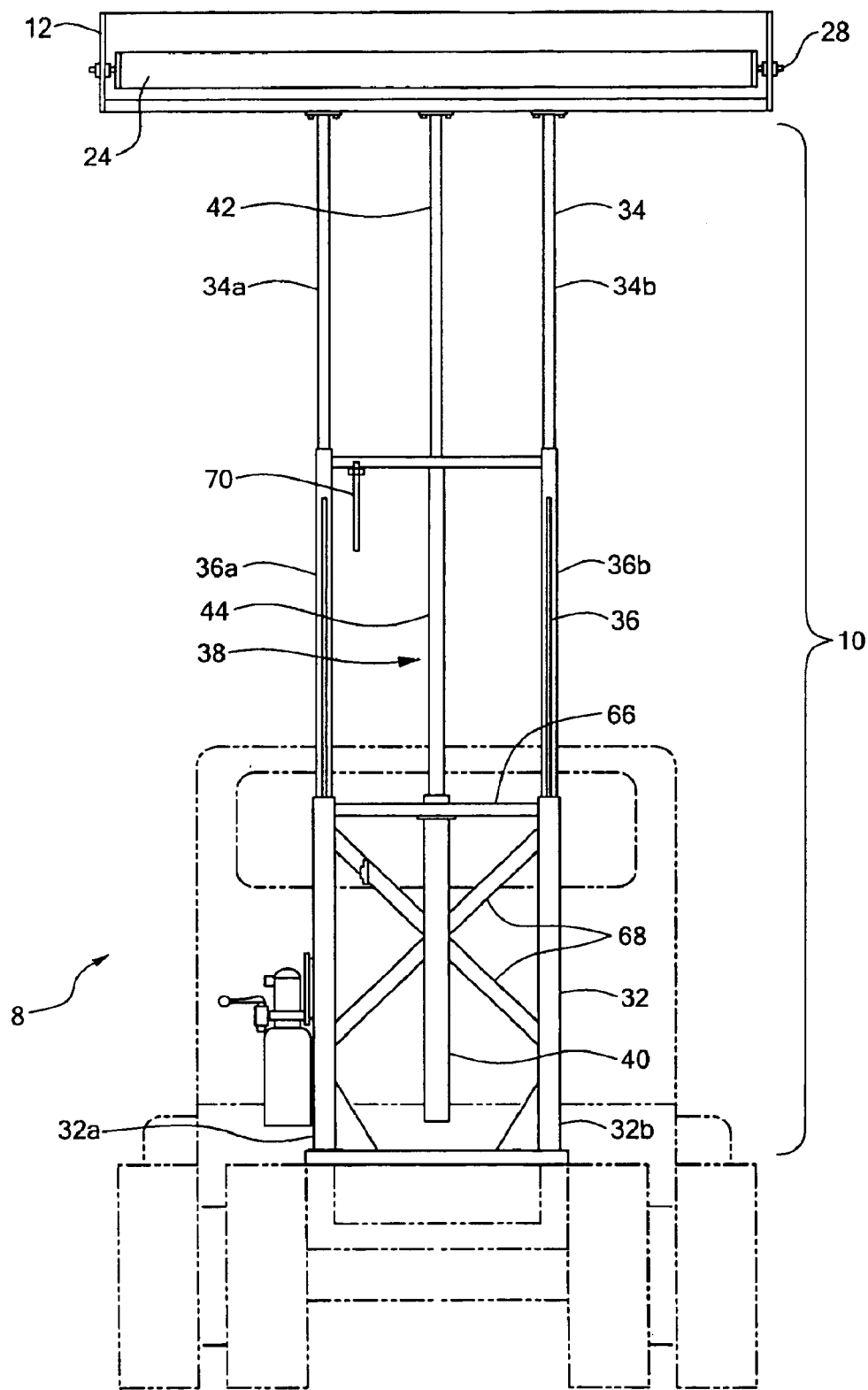
FIG. 4 is a rear view of the gantry assembly of FIG. 1 in a raised position.

The gantry assembly 10 is more particularly shown in FIGS. 3, 3A and 4. In FIGS. 3 and 3A, the gantry assembly is in a lowered position. FIG. 4 depicts the gantry assembly in a fully raised position. The cover 24 is wound around a spring-loaded roller 28 housed within the cover assembly 12. Such rollers are well known and understood, although those in the art could appreciate other structures for this purpose.

The structure of the gantry assembly 10 includes three telescoping sections with each section having a pair of legs. First, a base section 32, with legs 32a and 32b, is fixed to the truck 8. Second, a top section 34, with legs 34a and 34b, is fixed to the cover assembly 12. Third, a middle section 36, with legs 36a and 36b, is disposed between the base section and the top section. These sections do not pull free vertically from one another because of stop mechanisms associated with the gantry assembly. The stop mechanisms associated with the gantry assembly are described in further detail below. One skilled in the art understands that the length and number of individual sections in the gantry assembly may vary depending on a particular application or use.

Referring to FIG. 4, the top section 34 is slidably disposed in the middle section 36. Likewise, the middle section is slidably disposed in the base section 32 of the gantry assembly 10. The gantry assembly also includes a lifting mechanism that actuates and raises the cover assembly 12. In an exemplary embodiment, the lifting mechanism is a hydraulic assembly 38. A variety of different lift mechanisms could be appreciated by one of skill in the art. Such mechanisms may include, for example, a motor-driven assembly, a pneumatic assembly or an electric-type assembly.

The hydraulic assembly 38 has three components. First, the hydraulic assembly has a stationary cylinder 40 fixed with respect to the base section 32 and the truck 8. In the depicted embodiment, an upper end of the cylinder is attached to a cross member 66 associated with the base section. Second, an upper piston 42 is fixed to the cover assembly 12. Third, the assembly has a mid member 44 positioned between the cylinder and the upper piston. The functionality and structure of the hydraulic assembly is well understood by those in the art such that additional detail is not required to practice the covering system 6.

In operation, the hydraulic assembly 38 is actuated and begins to extend the upper piston 42 fixed to the cover assembly 12. As the cover assembly moves upward, the top section 34 fixed thereto also rises. Upward movement of the top section pulls the section's legs 34a and 34b from the pair of legs 36a and 36b of the middle section 36. This pulling is telescopic as the top section slidably extends from the middle section. The telescopic pulling continues until a first stop mechanism 46, see FIG. 5, between the top section and the middle section, described in further detail below, is engaged. Alternatively, the top section may extend from the middle section only until the upward stroke of the upper piston is concluded. The operator 20 may also stop the hydraulic assembly at any point while the cover assembly is moving upward, including prior to engagement of the first stop mechanism.

Typically, engagement of the first stop mechanism 46 concludes the stroke of the upper piston 42, and actuates the mid member 44 of the hydraulic assembly 38 which begins to rise. The movement upward of the mid member lifts the legs 36a and 36b of the middle section 36 out from the base section's legs 32a and 32b. This lifting is telescopically similar to the described pulling of the top section 34 out from the middle section. Pulling the middle section out from the base section 32 continues until a maximum height for the gantry assembly 10 is reached by completion of the upward stroke of the hydraulic assembly's mid member. Alternatively, a maximum height may be reached by engaging a second stop mechanism 58, see FIG. 7, between the middle section and the base section. Otherwise, the middle section may be inadvertently pulled from the base section. The height to which the gantry assembly is raised may also be controlled by the operator's 20 command of the hydraulic assembly.

It is appreciated by those in the art that the stroke length of the upper piston 42 and mid member 44 of the hydraulic assembly 38 may vary for different applications. This variation may change the maximum height achievable by the gantry assembly 10.

In an exemplary embodiment, the hydraulic assembly 38 is powered by a stand-alone electro-hydraulic power unit. This power unit is not particularly shown, although it is generally understood by those in the art. Alternatively, the hydraulic assembly may be powered by tapping into an existing hydraulic source on the truck 8. This may be accomplished using a priority flow diverter in conjunction with a 4-way, open-centered directional control valve; however, numerous other means for such could be contemplated by one skilled in the art.

Figure 5:
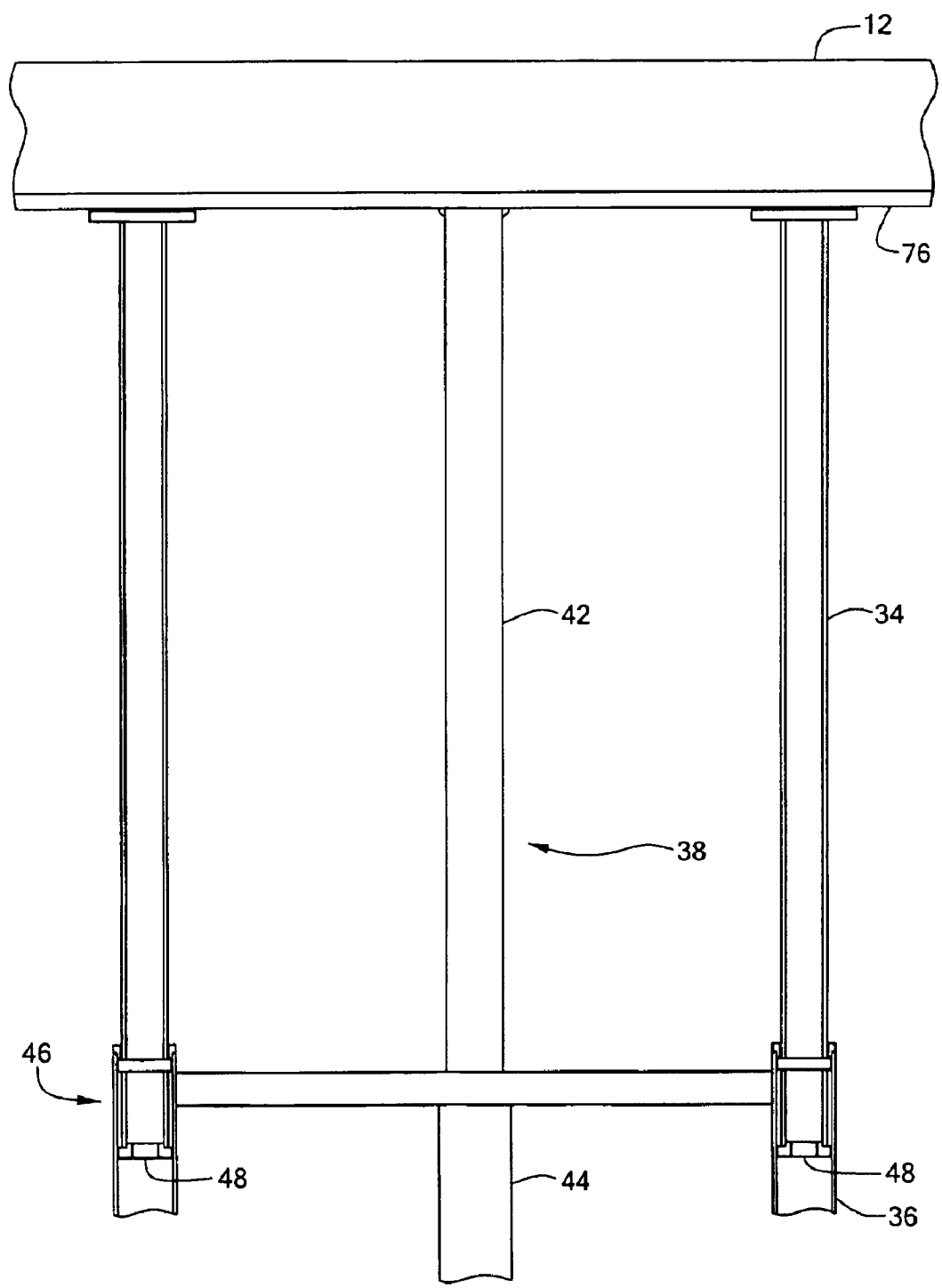
FIG. 5 is a partial view of the gantry assembly of FIG. 1 showing a top section, a middle section and a cover assembly.
Figure 6:
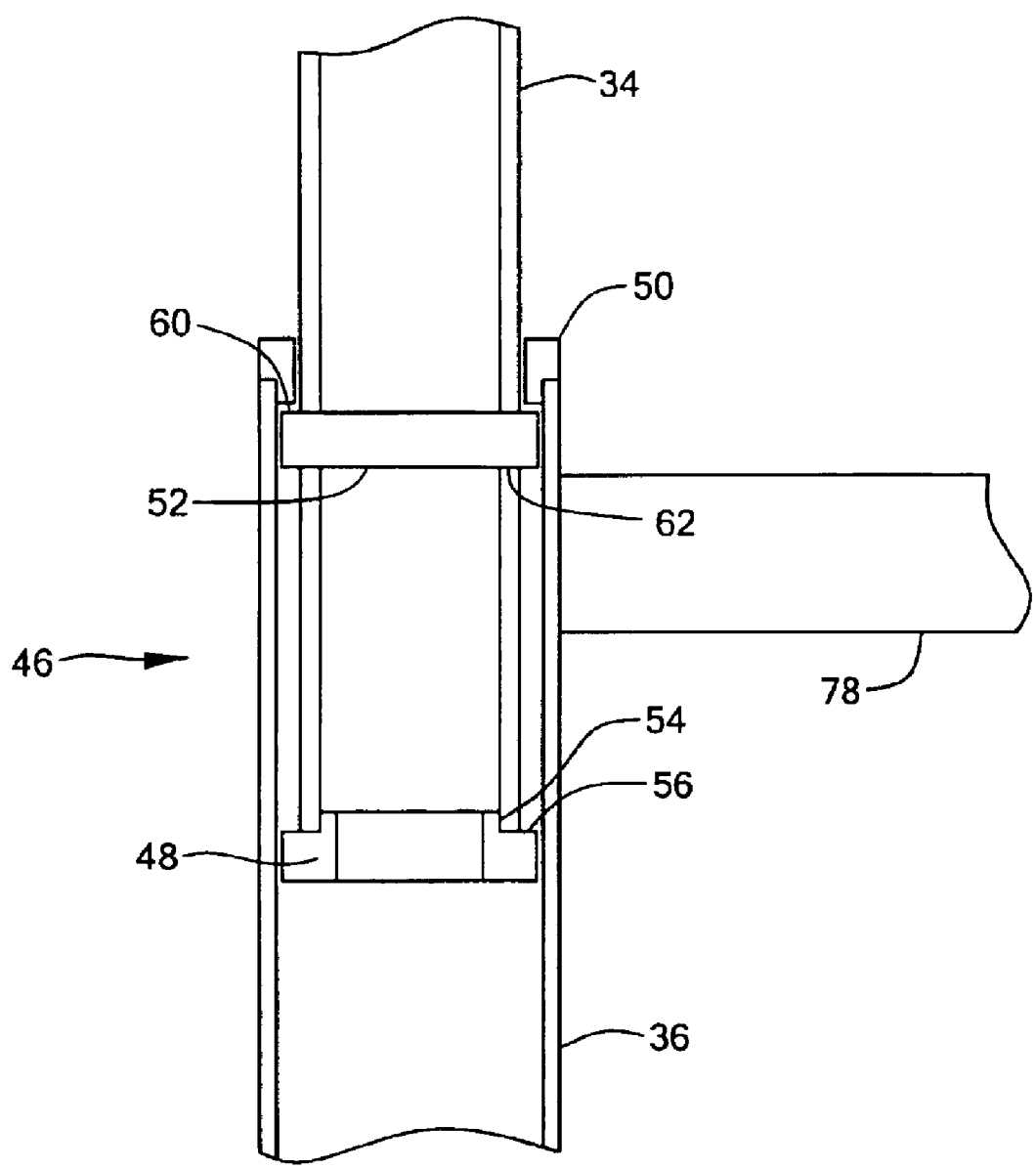
FIG. 6 is a partial view of the gantry assembly of FIG. 1 showing a first stop mechanism.

The gantry assembly 10 and the hydraulic assembly 38 are shown more particularly in FIGS. 5 and 6. The legs 34a and 34b of the top section 34 are fixed to a beam or other cross member 76 extending beneath and fixed to the cover assembly 12. The upper piston 42 is also fixed to the cross member of the cover assembly. As the hydraulic assembly moves upward, the upper piston lifts the cover assembly. With the top section attached to the cover assembly, the top section also rises. The top section typically moves upward until the first stop mechanism 46 is engaged.

Figure 7:
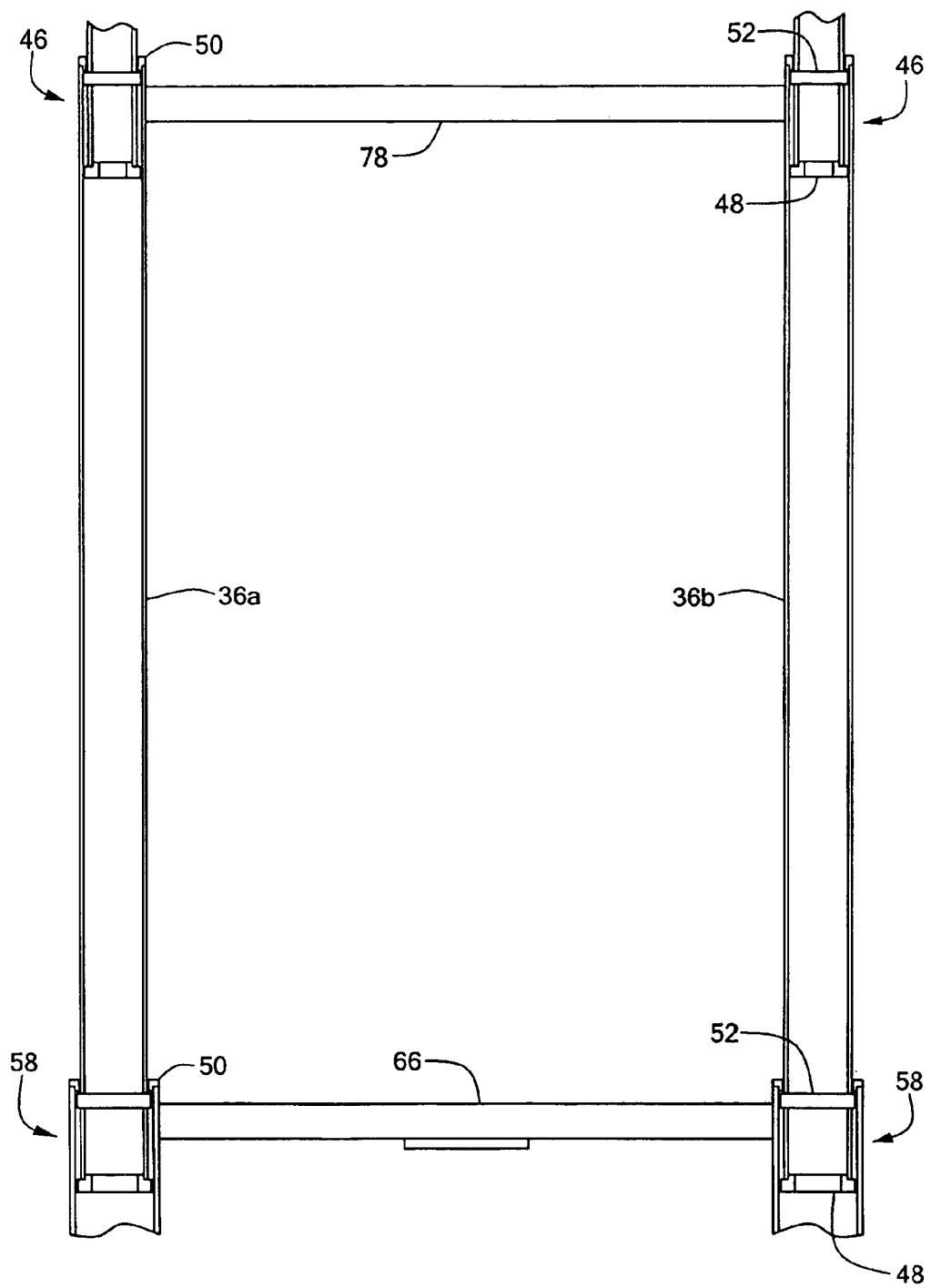
FIG. 7 is a partial view of the gantry assembly of FIG. 1 showing a first and second stop mechanism.
Figure 8:
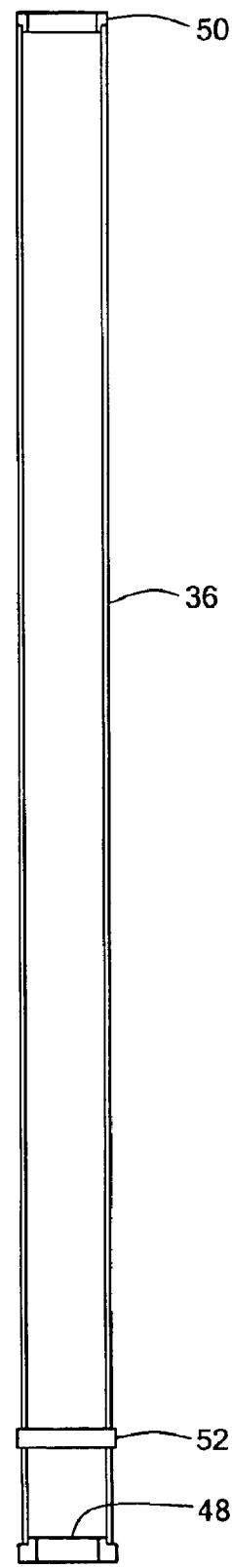
FIG. 8 is a partial view of the gantry assembly of FIG. 1 showing the middle section.

As described, the top section 34 telescopically pulls out from the middle section 36 until the first stop mechanism 46 is engaged. The slidable movement of the top section from within the middle section is facilitated by a bearing member 48 disposed in a lower end of the top section's legs 34a and 34b. A bearing member is also disposed at the lower end of the middle section's legs 36a and 36b, facilitating telescopic movement of the middle section from within the base section 32, as shown in FIGS. 7 and 8.

Generally, bearing members 48 may be made of any type of suitable material such as, for example, molded plastic or metal. One of skill in the art can appreciate that a variety of suitable structures and configurations could also be used to facilitate movement of one section relative to another section. In an exemplary embodiment, the bearing members of the top section 34 and the middle section 36 are identical, although those in the art could contemplate an instance in which these members are not necessarily the same.

The following describes the bearing member 48 at the lower end of the top section 34. This description is similarly applicable to the middle section's 36 bearing member.

The bearing member 48 of the top section 34 slidably moves within the legs 36a and 36b of the middle section 36. This movement occurs as the majority of the middle section's legs are hollow. Similarly, the middle section's legs may be completely hollow. The legs 34a and 34b of the top section and the base section's legs 32a and 32b are also predominantly or entirely hollow, which aids the movement of the bearing members without compromising the structural integrity of the gantry assembly 10.

The bearing member 48 has a geometry in which a portion is disposed within the top section 34 and another portion resides outside of the section, covering the lower end thereof. The bearing member is flanged, wherein a surface 54 of a cylindrical body abuts the top section's interior, and a shoulder 56 of an annular flange abuts a rim of the section's lower end. The bearing member extends radially outward past the diameter of the top section such that a radial outer surface is disposed within the diameter of the middle section 36.

A variety of bearing member 48 geometries may be contemplated by those skilled in the art. For example, the top section 34 may have an elliptical or circular cross-sectional geometry, and the bearing member may conform thereto. The bearing member may also be fixed to the top section by any suitable means including fasteners and screws.

The bearing member 48 of the top section 34, and more particularly the member's radial outer surface, is in slidable contact with the interior of the middle section 36, permitting the top section to pull out from the middle section during upward movement of the gantry assembly 10. Similarly, the middle section's bearing member is in slidable contact with the interior of the base section 32. This slidable contact enables the middle section to pull out from the base section.

The first stop mechanism 46 is shown particularly in FIG. 5, and is associated with the top section 34. The first stop mechanism prevents the top section from rising further within the middle section 36 as is caused by the upward stroke of the upper piston 42. The first stop mechanism includes a contact member 52 and a stop member 50. This description of the first stop mechanism is also applicable to the second stop mechanism 58 associated with the middle section pulling out from the base section 32.

The contact member 52 is proximate to and above the bearing member 48 at the lower end of the top section 34. In the embodiment illustrated, the contact member is a pin that protrudes through apertures 62 in the top section such that the member extends outwardly beyond the section's diameter. An upper surface 60 also contacts the stop member 50. Thus, the top section is capable of passing through a diameter in which the contact member cannot. The contact member may be formed from a variety of suitable materials such as molded plastic or metal. Moreover, the contact member is not necessarily formed in a geometry related to the cross-sectional geometry of the top section. For example, the contact member may be annular or in rectangular form, providing that the contact member extends beyond the exterior of the top section. Alternatively, the contact member may be a protrusion adhered to the exterior of the top section.

The contact member, however, is within the interior diameter of the middle section 36 such that, for example, the member traverses the section. FIG. 5 particularly shows the stop member 50 of the first stop mechanism 46. The stop member is annularly disposed and fixed at an upper end of the middle section 36. The annular geometry of the stop member may vary depending on a particular application, or the geometry of the middle section. For example, the stop member may be a protrusion on an interior of the middle section such that the contact member 52 is capable of engaging therewith. The circular cross-sectional geometry of the middle section is appropriate for an annular stop member. The annular stop member also provides a suitable engagement surface for contact with the contact member.

The stop member 50 may also be formed from a variety of different materials such as, for example, molded plastic or metal. Similarly, the stop member may be fixed to an individual section of the gantry assembly 10 by any suitable means including fasteners and screws.

The stop member 50 is partially disposed within the middle section 36. Additionally, the stop member extends above the upper end of the middle section. The stop member is flush with a rim of the upper end, and does not extend outwardly beyond the section's diameter as defined in part by the rim. The stop member is also flanged such that a shoulder flushly abuts the section's rim, and a surface of the annular body abuts the interior thereof. The stop member's diameter permits upward movement of the top section 34; however, the diameter is not sufficient for the contact member 52 to rise by without contact. Accordingly, contact between the stop member and the contact member stops the top section's upward movement, and is generally referred to as engagement of the first stop mechanism 46.

As the top section 34 pulls out from the middle section 36, the stop member 50 may slidably contact the top section. Similarly, in reference to the second stop mechanism 58, the stop member of the base section 32 permits the middle section to pull out and slide by the member.

The first stop mechanism 46 operates with the top section's contact member 52 moving upward and slidably traversing the middle section 36. This upward movement is caused by the hydraulic assembly's upper piston 42 lifting the cover assembly 12 and the top section 34 fixed thereto. The top section's movement within the middle section is aided by the bearing member 48. As the section rises, the contact member approaches engagement with the stop member 50. During engagement, the contact member's upper surface contacts and abuts a lower edge of the stop member, stopping the top section from further movement upward.

After engagement of the first stop mechanism 46, the hydraulic assembly 38 continues to lift the cover assembly 12. With the top section 34 fully extended, the lifted cover assembly pulls the middle section 36 from the base section 32. As previously described, the movement of the middle section is similar to the bearing aided movement upward of the top section.

A maximum height of the gantry assembly 10 is typically achieved as the middle section's contact member 52 contacts and abuts the stop member 50 disposed and fixed at the upper end of the base section 32. Contact between this contact member and stop member is generally referred to as engagement of the second stop mechanism 58.

Particular shown in FIG. 7 is the structure and geometry of the first stop mechanism 46 and the second stop mechanism 58. In addition, FIG. 7 shows the bearing members 48 at the lower ends of the top section 34 and the middle section 36. Although above the bearing members, the contact members 52 are proximate to the sections' lower ends. With the stop mechanisms both engaged, the gantry assembly 10 is at a maximum height.

The middle section 36 of the gantry assembly 10 is shown particularly in FIG. 8. As previously described, the bearing member 48 is disposed at the section's lower end, and the stop member 50 is disposed at the upper end. The contact member 52 is proximate to and above the bearing member 48 at the lower end of the section.

FIG. 7 also shows the stop members 50 at the upper ends of the middle section 36 and the base section 32. Latitudinally fixed to the legs of these sections are cross members 66 and 78. These cross members in part provide structural integrity to the gantry assembly 10. The lower cross member fixed with respect to the base section 32 provides an interface between the cylinder 40 and mid member 44 of the hydraulic assembly 38. Similarly, the hydraulic assembly's upper piston 42 and mid member interface at the upper cross member fixed with respect to the middle section. The hydraulic assembly may pass through an aperture in the cross member of the middle section such that the assembly's motion is not impeded.

The structural integrity of the gantry assembly 10 is also aided by diagonal cross bracing 68 fixed with respect to the base section 32. This cross bracing is particularly depicted in FIGS. 3 and 4. One in the art appreciates the numerous structures that might be used for this bracing depending on a given application. Additionally, FIGS. 3 and 4 show an alarm system 70 attached to the gantry assembly. The system signals in the event that the assembly is raised when movement of the truck 8 begins. Numerous systems are contemplated by those in the art for this purpose.

In describing the covering system 6 and the system's gantry assembly 10, hydraulic assembly 38 and cover assembly 12, it is generally understood that several different structures, geometries and materials for the system could be contemplated. For example, the geometries of the gantry assembly sections may be not be cylindrical depending on a particular use. Similarly, the gantry assembly may be composed of aluminum, 'steel, composites or other suitable materials. The relative positions of the stop mechanisms and their different members, mainly the bearing members 48, stop members 50 and contact members 52, disposed within or at an end of each section may also be arranged as desired for a particular application.

The covering system 6 of the present invention provides several advantages. A particular advantage relates to the height that may be achieved by the gantry assembly 10. One embodiment of the gantry assembly may extend to twelve feet above the truck cab 14 or transport container 16, a significantly greater height than those assemblies disclosed in the art. The height achievable by the gantry assembly is limited in part by the dimensions of the assembly's sections, or that of the lift mechanism's components. Similarly, the number of sections or components, respectively, will alter the maximum height of the system. The ability of the assembly's sections to telescope provides stability to the gantry assembly as the cover assembly 12 is lifted upward.

A gantry assembly 10 that extends several feet above the top of a container 16 ensures that during deployment the cover 24 will not contact the load 18 therein. As a consequence, covers are damaged less frequently and maintenance costs are reduced. In addition, the litany of problems associated with a cover contacting a container load are not observed with the present invention. Such problem includes, for example, debris being pulled from the load which may harm an operator 20.

Another advantage of the present system 6 is that the stop mechanisms of the telescoping sections help reduce the likelihood that the sections will lodge together. This lodging may occur because of, for example, debris, moisture or inclement weather conditions. For example, the top section 34 may lodge within the middle section 36 such that as the hydraulic assembly 38 moves upward, the middle section rises along with the top section. In this situation, the second stop mechanism 58 prevents the middle section from pulling free from the base section 32. Continued upward force by the hydraulic assembly may also serve to dislodge one telescoping section from another.

The present covering system 6 may reduce the typical problems associated with a lift mechanism that is not fixed with respect to the truck body 8 or container 16. For example, when a mechanism moves upward along with a cover assembly 12, there may be a reduced capacity to lift, as well as additional moving parts that tend to increase maintenance and operation costs. Likewise, more moving parts create problems relating to operator 20 safety. Given that the present system has a lift mechanism fixed with respect to the truck or container, such problems are avoided.

While the invention is described through the above exemplary embodiments, it will be understood by those of ordinary skill in the art that modification to and variation of the disclosed embodiments may be made without departing from the inventive concepts herein disclosed. Specifically, while the disclosed embodiments include reference to a cover system 6 mounted on a truck 8, the present invention is equally applicable to being mounted on other transport vehicles with which transport containers are employed such as trailers or train cars. Accordingly, the invention should not be viewed as limited except by the scope and spirit of the pending claims.

What is claimed is:

1. A system for covering a transport container on a truck, comprising:
    a cover assembly comprising a flexible cover deployable to cover the transport container; and
    a gantry assembly comprising:
        a base section fixed with respect to the truck;
        a movable section liftably disposed with respect to the base section and having an upper end fixed to the cover assembly, wherein the movable section comprises an upper movable section, and further comprising a middle movable section liftably disposed on the base section, the upper movable section liftably disposed on the middle movable section; and
        a lift mechanism fixed with respect to the base section and operative to lift the movable section and the cover assembly above the transport container on the truck.

2. A system for covering a transport container on a truck, comprising;

a cover assembly comprising a flexible cover deployable to cover the transport container;

a gantry aessembly comprising:

a base section fixed with respect to the truck;

a movable section liftably disposed with respect to the base section and having an upper end fixed to the cover assembly;

a lift mechanism fixed with respect to the base section and operative to lift the movable section and the cover assembly above the transport container on the truck; and a stop mechanism disposed between the base section and the movable section configured to prevent the movable section from removing completely from the base section.

3. The covering system of claim 2, wherein:

the base section comprises a pair of legs, and the movable section comprises a pair of legs telescopically disposed within the pair of legs of the base section; and the stop mechanism comprises a stop member disposed at an upper end of the legs of the base section and a contact member disposed near and protruding radially from a lower end of the pair of legs of the movable section for abutting contact with the contact member when the movable section extends from the base section.

4. The covering system of claim 3, wherein the contact member comprises a pin extending diametrically across each of the legs of the movable member.

5. The covering system of claim 3, wherein the stop member comprises a depending annular ring disposed circumferentially within an inner diameter of the legs of the base member.

6. A system for covering a transport container on a truck, comprising:

a cover assembly comprising a flexible cover deployable to cover the transport container;

a gantry assembly comprising:

a base section fixed with respect to the truck;

a movable section liftably disposed with respect to the base section and having an upper end fixed to the cover assembly;

a lift mechanism fixed with respect to the base section and operative to lift the movable section and the cover assembly above the transport container on the truck, wherein the lift mechanism comprises a cylinder member fixed with respect to the base section and a piston member fixed with respect to the movable section and extension of the piston member from the cylinder member is operative to extend the movable section from the base section; and father comprising a middle movable section liftably disposed on the base section, the movable section comprising an upper movable section liftably disposed on the middle movable section; and wherein:

the lift mechanism comprises a cylinder member fixed with respect to the base section, an upper piston, member fixed with respect to the upper movable section, and a mid member between the upper piston member and the cylinder member; and extension of the upper piston member is operative to extend the upper movable section from the middle movable section, and extension of the mid member is operative to extend the middle movable section from the base section and to continue lifting of the upper movable section.

7. A system for covering a transport container on a truck, comprising:

a cover assembly comprising a flexible cover deployable to cover the transport container; and a gantry assembly comprising:

a base section fixed with respect to the truck;

a movable section liftably disposed with respect to the base section and having an upper end fixed to the cover assembly; and a lift mechanism fixed with respect to the base section and operative to lift the movable section and the cover assembly above the transport container on the truck, and wherein the gantry assembly is configured to raise the cover assembly twelve feet above a bed of the truck.

* * * * *

UNITED STATES PATENT AND TRADEMARK OFFICE
CERTIFICATE OF CORRECTION

| | | |
|---|---|---|
| PATENT NO. | : 6,896,312 B2 | Page 1 of 1 |
| APPLICATION NO. | : 10/824191 | |
| DATED | : May 24, 2005 | |
| INVENTOR(S) | : Robert A. Talbot | |

It is certified that error appears in the above-identified patent and that said Letters Patent is hereby corrected as shown below:

Column 9, claim 2, line 3, "aessembly" should read --assembly--; and

Column 10, claim 6, line 9, "father" should read --further--.

Signed and Sealed this

First Day of August, 2006

JON W. DUDAS
*Director of the United States Patent and Trademark Office*